United States Patent Office 3,560,444
Patented Feb. 2, 1971

3,560,444
HEAT REACTIVE MIXTURES OF BIS(HYDRO-
CARBYLOXYALKYL) ESTERS OF AROMATIC
TETRACARBOXYLIC ACIDS AND AROMATIC
DIAMINES
Ralph E. De Brunner, Kettering, Ohio, assignor to
Monsanto Research Corporation, St. Louis, Mo.
No Drawing. Original application June 30, 1966, Ser. No.
561,755. Divided and this application Sept. 9, 1968,
Ser. No. 767,574
Int. Cl. C08g 20/32
U.S. Cl. 260—65
3 Claims

ABSTRACT OF THE DISCLOSURE

Heat reactive mixtures of bis(hydrocarbyloxyalkyl) esters of aromatic tetracarboxylic acids and aromatic diamines, said mixtures being useful as coating and laminating compositions.

---

This is a division of application Ser. No. 561,755, filed June 30, 1966, and now abandoned.

This invention relates to coating and laminating compositions and more particularly to certain new and valuable partial esters of tetracarboxylic acids and nitrogenous polyesters, and the method of preparing polyimides therefrom.

According to the invention, there are provided bis(hydrocarbyloxyalkyl) esters of aromatic tetracarboxylic acids and heat-reactive liquid mixtures prepared by contacting a solution of the esters with an aromatic diamine. The liquid mixtures have high utility in coating, adhesive, and laminating applications, including the fabrication of composites, in that they are readily converted to resins of the polyimide type.

Polyimide resins are generally well known in the art. See, e.g., British Pats. 980,274 (1965), 942,025 (1963) and 903,271–2 (1962) and U.S. Pats. 3,190,856 and 3,220,882. They are usually prepared by reaction of an aromatic tetracarboxylic acid dianhydride with an organic diamine to obtain an intermediate, curable prepolymer wherein there are present amide linkages from an amino group of the diamine and a carboxy group of the tetracarboxylic component, with two carboxy groups of the tetracarboxylic component being unlinked to the organic amine component. Upon heating at elevated temperatures, intramolecular cyclization occurs with reaction of the unreacted carboxylic group at the amide portion of the polymer to give an imide structure. Thus, condensation of, say, 1,2,4,5-benzenetetracarboxylic dianhydride and p-phenylenediamine to give a prepolymer amide-acid and curing of the latter to a polyimide proceeds substantially as follows:

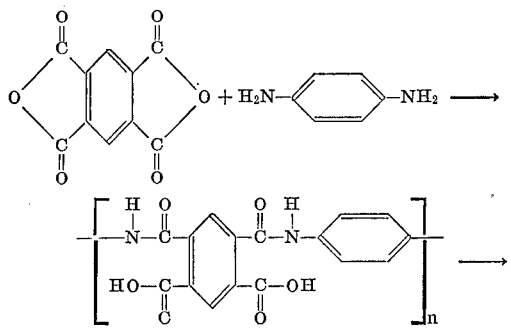

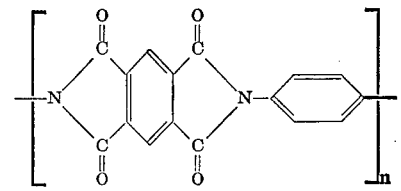

where $n$ denotes the degree of polymerization.

Because curing of the polyamide/acid gives the exceptionally stable polyimides, the prepolymers are of great potential interest for the preparation of heat- and solvent-resistant finishes and composites. In such applications, curable materials are generally most expediently employed in solution. However, the usual prior art polyamide/acids possess limited solubility; hence, in order to employ them in these fields, it has been necessary to use such uncommon, expensive solvents such as N-methylpyrrolidone, dimethylformamide, dimethylacetamide, pyridine, dimethyl sulfoxide, etc. A further limitation on the wide applicability of the polyamide acids is the noxious nature of such solvents. A very significant technical disadvantage stems from the fact that in the preparation of laminates or composites, use of a difficultly soluble impregnating agent is hard on the manufacturing equipment, e.g., dipping tanks. Clean-up becomes a cumbersome, expensive operation whenever water and/or readily available solvents are ineffective for this purpose.

Another disadvantage of prior polyimide-forming compositions is the frequent necessity of using high temperatures, e.g., temperatures of 600° F. to 700° F. in the press cycle in order to obtain conversion to the polyimide. The higher the temperatures at which fusion of the polyamide/acid permitted molding, the more vigorous was the escape of by-product water and/or alkanol and hence the more tendency to form weakening bubbles in the laminate structure.

Also, although the polyimides obtained from prior art polyamide/acids or polyamide/carboxylates possess very good thermal properties, the mechanical properties, while not inferior, could well be improved.

Accordingly, an object of this invention is the provision of new and valuable tetracarboxy compounds for use in the preparation of polyimide resins. Another object is the provision of improved impregnating solutions or varnishes for use in laminate fabrication. An important objective is the provision of improved polyimide resins.

These and other objects hereinafter disclosed are provided by the invention wherein there is provided an ester of the formula

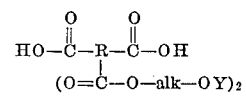

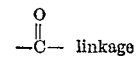

wherein R is a tetravalent aromatic radical of from 6 to 24 carbon atoms, is free of olefinic and acetylenic unsaturation and of substituents which react with the amine radical in preference to a radical containing the $$-\overset{O}{\underset{\|}{C}}-\text{ linkage}$$

and wherein one pair of the radicals

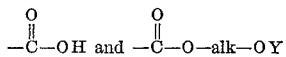

is positioned at a first pair of non-tertiary nuclear carbon atoms which are immediately consecutive and wherein the other pair of the radicals

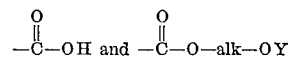

is positioned at a second pair of non-tertiary nuclear carbon atoms which are immediately consecutive, said second pair being separated from the first pair by at least one carbon atom; alk denotes an alkylene radical having from 2 to 4 carbon atoms in the chain and a total of from 2 to 8 carbon atoms; and Y is a hydrocarbyl radical free of olefinic and acetylenic unsaturation and containing from 1 to 8 carbon atoms.

The invention also provides a heat-reactive, liquid mixture or varnish suitable for use as a coating composition or an impregnating agent in the preparation of composites, which liquid mixture is prepared by contacting (I) the above ester, (II) an inert organic liquid solvent for said ester, and (III) a diamine of the formula $$H_2N-Z-NH_2$$

wherein Z is an aromatic radical having from 6 to 18 carbon atoms and being free of olefinic and acetylenic unsaturation and of substituents which react with the carboxy radical more readily than does the amine radical.

Drying and heating of the varnish up to a temperature of, say, about 150° C., results in a condensation reaction to give polyamide having ether-ester group thus:

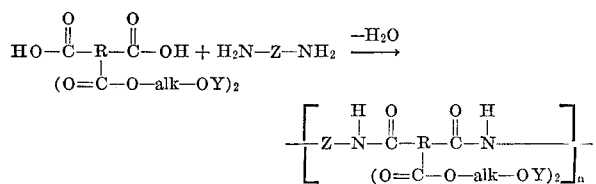

wherein alk, R, Y and Z are as above defined, and $n$ denotes the degree of polymerization.

Continued heating, say at up to about 500° C., and preferably up to about 350° C., results in liberation of a hydroxy ether, HO-alk-OY, with intramolecular cyclization to the polyimide:

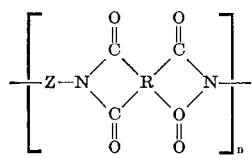

The hydroxy ether is volatilized at a steady rate during the curing; hence, bubble-formation, such as that encountered with sporadically or suddenly evolved by-product is minimized. Moreover, any of the hydroxy ether which is retained in the cured product serves to plasticize it. Being water-soluble, the hydroxy ethers are readily washed off any of the equipment.

Advantageously, the bis(hydrocarbyloxyalkyl) esters which are condensed with the diamine in preparing the polyamide ether-esters are obtained by reacting an appropriate aromatic tetracarboxylic acid or the dianhydride thereof with an appropriate alkylene glycol ether. Even though an excess of the said ether is used, complete esterification is not obtained. The alkylene glycol ether is a convenient solvent for the esterification and for the polyamide-forming reaction.

The invention thus also provides a simple and convenient means of preparing polyamide (and subsequently polyimide) structures, which method comprises (1) contacting a tetracarboxy compound of the formula

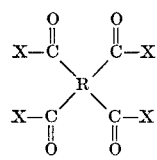

wherein each X denotes —OH when taken singly and two X's taken together stand for —O—, and R is as above defined with an alkylene glycol ether of the formula HO-alk-OY wherein alk and Y are as above defined, to obtain a solution, in said ether, of a bis(hydrocarbyloxyalkyl)ester of the formula

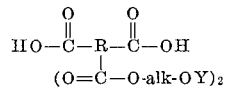

(2) contacting said solution with the diamine $$H_2N-Z-NH_2$$

wherein Z is as above defined, to obtain a varnish. (3) applying the varnish to a substrate and drying and heating at up to about 150° C. to obtain deposited upon the substrate the polyamide/carboxylate

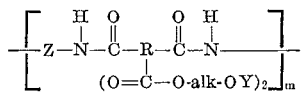

As hereinbefore disclosed, heating at higher temperatures gives the polyimide. The diesters may also be prepared by metathesis or cross-esterification, e.g., by reaction of a lower dialkyl tetracarboxylate with the alkylene glycol ether. When said dialkyl tetracarboxylates are reacted with the alkylene glycol ethers to give the diesters, alkanols are the by-products. Although the alkanols are generally poor solvents for polyamide/acids obtained by reaction of diamines with tetracharboxylic acids or the dianhydrides thereof, they are good solvents for the present varnishes. Accordingly, the presence of the by-product alkanols is immaterial.

Examples of the bis(hydrocarbyloxyalkyl) esters which are provided by the invention include the simple and mixed esters, e.g., the bis(alkoxyalkyl), the bis(cycloalkoxyalkyl) and the bis(aryloxyalkyl) esters, such as the bis(2-methoxy-, ethoxy-, propoxy-, butoxy-, hexyloxy- or octyloxyethyl), the bis(4-methoxy- or propoxybutyl), bis-(3 - ethoxy- or methoxypropyl) or the bis(2 - ethyl-2-methoxy - 3 - pentylpropyl, or the bis(2-phenoxyethyl), the bis (4-phenoxybutyl), the 2-phenoxyethyl 3-methoxypropyl, the bis(3-o, m- or p-tolyloxypropyl), bis[2-(p- hexylphenoxy)ethyl], the benzyloxyethyl 4-ethoxybutyl, or the bis(3-cyclopentyloxypropyl) esters of the aromatic tetracarboxylic acids, generally, so long as such acids are free of nonbenzenoid unsaturation and of substituents which react with an amine radical more readily than does the carboxy group and so long as the carboxy and carboxylate radicals are positioned as described above; such as 1,2,4,5-benzenetetracarboxylic acid;
1,4,5,8-naphthalenetetracarboxylic acid;
3,3′,4,4′-biphenyltetracarboxylic acid;
2,2′,3,3′-biphenyltetracarboxylic acid;
3,6-dimethoxy-1,2,4,5-benzenetetracarboxylic acid;
2,2′,5,5′-tetramethyl-3,3′,4,4′-biphenyltetracarboxylic acid;
3,4,9,10-perylenetetracarboxylic acid;
4,4′-isopropylidenediphthalic acid;
1,8,9,10-phenanthrenetetracarboxylic acid;
4,4′-carbonyldiphthalic acid;
4,4′-[2,2,2-trifluoro-1-(trifluoromethyl)ethylidene]diphthalic acid;
4,4′-oxydiphthalic acid;
4,4′-sulfonyldiphthalic acid; etc.

Presently preferred are the bis(hydrocarbyloxyalkyl) esters of 4,4′-carbonyldiphthalic acid, i.e., compounds of the structure

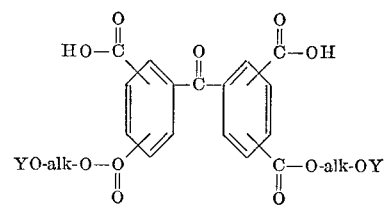

An ester of two or more different alkylene glycol ethers and the aromatic tetracarboxylic acid may be used, e.g., there may be employed mixed esters obtained by esterifying one of the four carboxylic groups with one hydroxy ether and then esterifying another carboxylic group with a different hydroxy ether.

The diamine with which the bis(hydrocarbyloxyalkyl) ester is reacted may be an aromatic diamine which has from 6 to 18 carbon atoms and which is free of non-benzenoid unsaturation and of substituents which react with the carboxy radical more readily than does the amine radical; e.g., 4,4'-oxydianiline, o-, m- or p-phenylenediamine, benzidine, 3,3'-dimethoxybenzidine, 1,4-, 5,8 - or 1,8 - naphthalenediamine, sulfonyloxydianiline, 4,4' methylenediamine, 4,4'-methylenebis(3-nitroaniline), 4,4'-ethylidenedianiline, 2,3,5,6-tetramethyl - p - phenylenediamine, 4,4'-oxybis(2,2'-propylaniline), etc.

Two or more different diamines or two or more different bis(hydrocarbyloxyalkyl) esters may be used as the respective amine and carboxylic reactants; e.g., a mixture of an amine such as benzidine and 4,4'-oxydianiline or p-phenylenediamine and 1,8-naphthalenediamine may be reacted with a single carboxylic component such as bis-(2 - ethoxyethyl) 1,2,4,5 - benzenetetracarboxylate or bis-(3 - methoxypropyl) 4,4' - carbonyldiphthalate or with a mixture of carboxlates such as a mixture of bis(3 - propoxybutyl) 4,4' - isopropylidenediphthalate and bis(2 - methoxyethyl) 3,4,9,10 - perylenetetracarboxylate or a mixture of bis(2 - butoxyethyl) 4,4' - carbonyldiphthalate and bis(2,3 - dimethyl - 4 - phenoxybutyl) 4,4' - carbonyldiphthalate. Thereby there are obtained polymers having different linkages dispersed more or less randomly in the polymer molecule. Such an expedient is useful in tailoring polymer structures having properties intermediate to those attributable to the individual linkages.

Because condensation of the bis(hydrocarbyloxyalkyl) ester of tetracarboxylic acid with the diamine occurs by reaction of the two free acid groups of the ester with the two amino groups of the diamine to form the polyamide/carboxylate, the ester and the amine are advantageously employed in such stoichiometric proportions, i.e., one mole of the ester per mole of the amine. However, a silght excess of either component may be used.

The presently provided varnishes are prepared by simply contacting the diamine with the bis(hydrocarbyloxyalkyl) ester in an inert, organic liquid medium which is a solvent for the ester. However, for facilitating complete reaction within an optimum period, it is preferred to employ a medium in which solution of both the ester and the diamine can be attained. If an excess of the alkylene glycol ether has been employed for esterifying the tetracarboxylic dianhydride, the excess can conveniently serve as solvent in the varnish. Also, if desired, to any excess of the alkylene glycol ether present in the esterification product there may be added one or more other solvents, e.g., in a lower alcohol or ether such as butanol or propyl ether. When production of the bis(hydrocarbyloxalkyl) ester has been conducted by transesterification, e.g., by reaction of an alkylene glycol ether with another diester of the tetracarboxylic acid, there is obtained as by-product a hydroxy compound corresponding to the alcoholic moiety of the starting ester, e.g., a lower alkanol when the starting ester is a dialkyl tetracarboxylate. The by-product hydroxy compound need not be removed from the crude esterification product previous to reaction of the bis(hydrocarbyloxyalkyl) tetracarboxylate component of said mixture with the diamine. For example, a dialkyl ester such as dibutyl 4,4'-carbonyldiphthlate is reacted with 2-methoxyethanol to give bis-(2-methoxyethyl) 4,4' - carbonyldiphthalate together with butanol as by-product. Without removing the butanol, the reaction mixture is treated with a diamine for obtaining the varnish. The butanol serves as solvent for both the bis(2 - methoxyethyl) ester and for the carboxylate-containing polymer. If dilution of either the polymer-forming reaction mixture or of the polymer-containing product is desired, there may be employed either a lower alkylene glycol or an ether thereof or a lower alcohol, ketone or alkyl ether. In the transesterification reaction as well as in esterification of the free tetracarboxylic acid or dianhydride thereof, an excess of the alkylene glycol ether is conveniently used for providing for proper esterification, for serving as solvent in the polymer-forming reaction, and in subsequent application of the polymer to substrate for conversion to polyimide.

Depending upon the quantity of solvent used, the reaction mixture comprising the diester, and the solvent (which advantageously is the same as that used for preparing the bis(hydrocarbyloxyalkyl) ester) may be used directly as a coating or impregnating agent. However, if the esterification reaction mixture is too fluid for the intended application, some of the solvent may be removed partially or even entirely by volatilization at ordinary pressure or by evacuation. Either the fluid concentrate obtained by removing only part of the solvent, or the solvent-free residue may be used for the preparation of laminates or other composites. The impregnated or coated substrate is then heated for conversion to the prepolymer, i.e., the polyamide/carboxylate.

Curing of the polyamide/carboxylate for conversion into the polyimide is conducted by heating either in air or in an inert atmosphere which may be, e.g., nitrogen, argon, or vacuum. Temperatures of from, say, 150° C. to 350° C. are preferred.

In a coating application, a suspension or solution of the polyamide/carboxylate, with or without pigments such as the titanium dioxide, zinc oxide, silica, alumina, iron oxide, etc. is preferably deposited upon the substrate and the diluent or solvent is evaporated from the substrate. Curing is then conducted by heating the substrate, with its deposit of dried coating preferably at a temperature of from about 150° C. to up to about 350° C. The curing temperature will depend upon such conditions as time and atmosphere, as well as upon the nature of the substrate. Generally, a lower curing temperature will require longer curing time. The nature of the substrate will have to be considered, of course, e.g., cellulosic substrates will not tolerate the high temperature to which most metallic and ceramic substrates can be subjected without deterioration. In experimental runs, the coated substrate will be maintained at the maximum temperature permitted by the substrate for a time of about a few minutes to several hours in order to assure completion of curing. This point can be readily ascertained in experimental runs by noting substantial cessation in weight change owing to volatilization of the by-product alkylene glycol ether resulting from the ring-closing imide-forming reaction between the carboxylate moiety and the unreacted amino radical of the carboxylate-containing polymer. The well cured film will be smooth, tenaciously adherent and tough.

For the preparation of laminates the impregnating varnish is used to coat and/or impregnate plies of substantially any desired material of construction, and the thus-treated plies are subjected to heat, with or without concomitant use of pressure. When pressure is employed, it generally need be only of a low order, e.g., pressures of from, say, about 10 to 200 p.s.i. may be used. Plies of glass, metal, plastics and ceramics are thus tenaciously bonded together. Other composites may be similarly prepared, employing filaments or textiles of glass, metal, silica, graphite, boron, etc. Finely comminuted reinforcing materials or fillers, which may be in microballoon form, may be incorporated with the carboxylate-containing polymer and solvent to form a mobile mass which can be formed while curing or such fillers may be used with the carboxylate-containing polymers when they are employed as coatings, impregnating agents or adhesives.

The presently provided polyamide/carboxylates possess utility per se in plastics and coating applications; i.e., they need not be converted to the polyimides because solutions thereof are useful as protective finishes when exposure to polyimide-forming temperatures is not contemplated. However, since the carboxylate-free, cured products, i.e., the polyimides, may be heated to about 350° C. in air and higher in an inert atmosphere without substantial weight loss and because the cured products are very solvent-resistant, conversion to the polyimides forms the major usefulness of the polyamide/carboxylates.

Whether or not the contemplated utility involves the polyamide/carboxylate or a polyimide as the end product, a very convenient method of operation involves preparing a bis(hydrocarbyloxyalkyl) ester of the aromatic tetracarboxylic acid by reacting the acid, or preferably its dianhydride, with the alkylene glycol mono-ether, using an excess of the said ether as a solvent to obtain a solution of bis(hydrocarbyloxyalkyl) tetracarboxylate in the mono-ether, mixing the solution with the appropriate diamine, and using the resulting mixture or varnish for application as a coating to a substrate, as an impregnating agent in the preparation of laminates or other composites, or for casting into a film. Conversion to the polyamide/carboxylate is effected in situ. For example, for the preparation of a composite, plies of an inorganic textile, say, of glass cloth or of a textile of silica, carbon or metal fiber are impregnated with the varnish and heated under pressure. Depending upon the extent of heating, the matrix of the resulting composite will consist essentially of either the polyamide/carboxylate or the polyimide to which it cyclizes upon continued heating at higher temperatures. Advantageously the varnish is applied to the substrate and polymerization to the polyamide/carboxylate is conducted by heating the substrate with its deposit before stacking to a laminate structure. The extent of heating will depend upon the varnish constituents. The varnishes prepared from the lower alkoxyalkanols, e.g., 2-methoxymethanol, require a lower temperature for drying and conversion to polyamide/carboxylate than do those prepared from the aryloxyalkanols. The stack is then compression molded at a temperature of above 150° C. and below about 500° C. at a pressure of, say, from about 10 p.s.i. to 1,000 p.s.i. to obtain a polyimide-containing laminate.

The invention is further illustrated by, but not limited to, the following examples.

EXAMPLE 1

A mixture consisting of 322.2 g. (1 mole) of 4,4'-carbonyldiphthalic anhydride and 476.3 g. (6.3 moles) of 2-methoxyethanol was gradually heated, with stirring, to about 120° C., and stirring at this temperature was continued for 0.5 hour after all of the solids had dissolved. The resulting reaction mixture, comprising a solution of bis(2-methoxyethyl) 4,4'-carbonyldiphthalate in 2-methoxyethanol, was allowed to cool to 40° C., and 108.1 g. of m-phenylenediamine was added thereto. The whole was then stirred for 1 hour to give a clear varnish having a solids content of 63.1% in 2-methoxyethanol.

The varnish was used as the impregnating agent in preparing "B"-staged laminating stock as follows: Panels of S–994 glass, 181 style, F–12 (heat-cleaned) cloth were dipped in the varnish, drained, and cured to the polyamide/carboxylate by heating on racks in a forced-draft (air) oven for 90 minutes at 80° C. and then for 30 minutes at 120° C.

In order to determine optimum pressing conditions, samples were cut from each panel, weighed, heated for 10 minutes at 225° C. and re-weighed. The content of resin and of volatiles was calculated from the determined differences in weight. Squares (4") were then cut from the panels and stacked to give 14-ply laminating assemblies.

From one "B"-staged panel, having a resin content of 27.9% and a volatiles content of 5.7%, the laminate obtained by pressing for 5 minutes at 260° C. and 40 p.s.i. followed by 55 minutes at 260° C. and 100 p.s.i. had a thickness of 0.138 to 0.142" and an average resin content of 21.8% (7.8% flowout). The laminate was post-cured by heating for two hours at each of the temperatures: 200°, 225°, 250°, 300°, 325° and 350° C. and then for 4 hours at 372° C. The resulting laminate, having a polyimide matrix, was found to have a flexural strength of about 51,900 p.s.i. and a flexural modulus of 2,600,000 p.s.i. (average of 3 flexural specimens), determined at room temperature.

Another "B"-staged panel, having a volatiles content of 5.7% and a resin content of 28.4% was used to make a 14-ply, 4" square laminate using the following press conditions: 2.5 minutes at 260° C./40 p.s.i. followed by 57.5 minutes at 260° C./200 p.s.i. The thickness of the light tan laminate thus obtained was from 0.131 to 0.135" and it had a resin content of 21.7%. Post-curing of the laminate was conducted as described above to give smooth, glossy laminates having a flexural strength of about 60,000 p.s.i. and a flexural modulus of about 2,900,000 p.s.i. (average for 3 flexural specimens).

In still another run there was employed a "B"-stage stock, prepared as described above and having a resin content of 27.8% and a volatiles content of 5.7% for preparing a 14-ply, 4" square laminate by employing a bleeder cloth technique in the pressing. In this method the stacked plies were enclosed in a pliant container or capsule which is vented for permitting escape of material which is volatilized during molding. In the present instance, the laminate assembly was incased with Teflon-lined glass cloth. Pressing was conducted for 60 minutes at 260° C. and 100 p.s.i. The resulting laminate was readily removed from the bleeder cloth, but had a dull finish rather than the glossy surface possessed by laminates prepared from the same stock but in absence of the bleeder cloth. The resin content of the laminate was 21%, and it had a thickness of from 0.127 to 0.131". After post-curing, as described above, it was found to have a flexural strength of about 64,400 p.s.i. and a flexural modulus of 3,100,000 p.s.i. (average for 3 flexural specimens). The very good thermal stability of this laminate was determined by heating for 100 hours at 371° C. At the end of that time, at the 371° C. temperature, the flexural strength was found to be about 37,000 p.s.i. The flexural modulus was only reduced to 2,700,000 p.s.i.

EXAMPLE 2

To 740.7 g. (5.4 moles) of β-phenoxyethanol there was slowly added, with stirring, 322.2 g. (1 mole) of 4,4'-carbonyldiphthalic anhydride. The resulting mixture was heated to 110° C. and stirred until all solids were dissolved. The resulting reaction mixture, comprising a solution of bis(2-phenoxyethyl) 4,4'-carbonyldiphthalate in 2-phenoxyethanol, was cooled to 40° C., 108.1 g. (1 mole) of m-phenylenediamine was added thereto, and the whole was stirred for about 2 hours to dissolve all of the solids. During this time, a 19° C. increase in the temperature of the reaction mixture was noted, indicating some reaction of the bis(2-phenoxyethyl) ester with the diamine.

The solution, having a solids content of 60%, was used as an impregnating varnish for S–994 glass, style 181, F–12 finish glass cloth and the impregnated cloth was heated for 90 minutes at 120° C. for "B"-staging to the polyamide/carboxylate. The stock thus obtained had a resin content of 32.8% and a volatiles content of 6.6%.

A 12-ply, 4" square assembly was prepared from this "B"-staged stock and pressed at 260° C./25 p.s.i. for 5 minutes and then at 260° C./100 p.s.i. for 40 minutes. The smooth, pressed laminate, having a thickness of from 0.114" to 0.117", was found to have an average resin content of 24.4%. After post-curing, as in Example 1, the average flexural strength of the laminate was found to be about 44,700 p.s.i. and the flexural modulus was found to be about 2,900,000 p.s.i.

Although, for purposes of comparison, the above examples are limited to the 2-methoxyethyl and the 2-phenoxyethyl esters of 4,4'-dicarbonylphthalic acid as the ester component and to m-phenylenediamine as the organic amine component of the polyimide-forming varnishes, other bis-(hydrocarbyloxyalkyl) esters and other diamines are likewise useful; thus, there may be prepared and employed the bis(3-propoxypropyl) or the bis(3- or 4-phenoxybutyl) ester of 4,4'-carbonyldiphthalic acid or 1,2,4,5-benzenetetracarboxylic acid or of other tetracarboxylic acids, e.g., 4,4'-isopropylidenediphthalic acid or 2,3,6,7-naphthalenetetracarboxylic acid and instead of the m-phenylenediamine there may be used benzidine or 1,8-naphthalenediamine or 4,4'-oxydianiline or 4,4'-sulfonyldianiline. The solvent may or may not be the alkylene glycol ether from which the bis(hydroxyalkyl) ester is derived. For example, instead of employing an excess of 2-methoxyethanol for preparing the bis(2-methoxyethyl) ester of 4,4'-carbonyldiphthalic acid as in the above examples, the ester may be prepared by employing in the reaction mixture only the stoichiometrically required quantity of the 2-methoxyethanol in the presence or absence of an inert, organic liquid diluent. Subsequently, for the polyamide- and polyimide-forming reactions, when an excess of the 2-methoxyethanol has not been used in forming the ester, there may be used such diluents as the lower alcohols.

Obviously, many modifications and variations of the invention may be made without departing from the spirit and scope thereof, and therefore only such limitations should be imposed as are indicated in the appended claims.

What is claimed is:

1. A heat-reactive, liquid mixture prepared by contacting (I) a diamine of the formula $H_2N—Z—NH_2$ wherein Z is an aromatic radical having from 6 to 18 carbon atoms and being free of olefinic and acetylenic unsaturation and of substituents which react with the carboxy radical more readily than does the amine radical, with (II) an ester of the formula

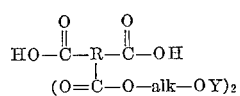

wherein R is a tetravalent aromatic radical of from 6 to 24 carbon atoms, is free of olefinic and acetylenic unsaturation and substituents which react with the amine radical in preference to a radical containing the

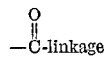

—C—linkage and wherein one pair of the radicals

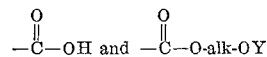

is positioned at a pair of the first non-tertiary nuclear carbon atoms which are immediately consecutive and wherein the other pair of the radicals

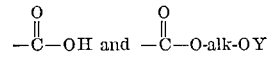

is positioned at a second pair of the first non-tertiary nuclear carbon atoms which are immediately consecutive, said second pair being separated from the first pair by at least one carbon atom; alk denotes an alkylene radical having from 2 to 4 carbon atoms in the chain and a total of from 2 to 8 carbon atoms; and Y is a hydrocarbyl radical free of olefinic and acetylenic unsaturation and containing from 1 to 8 carbon atoms, and (III) an inert organic liquid solvent for said ester.

2. The liquid mixture defined in claim 1, further limited in that Z is phenylene, alk is —$CH_2CH_2$—, R is

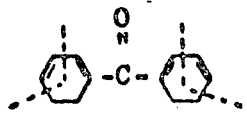

and Y is alkyl.

3. The liquid mixture defined in claim 1, further limited in that Z is phenylene, alk is ethylene, R is

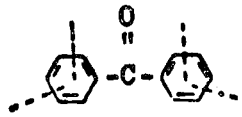

and Y is aryl.

References Cited

UNITED STATES PATENTS

| | | | |
|---|---|---|---|
| 3,282,897 | 11/1966 | Angelo | 260—47 |
| 3,347,808 | 10/1967 | Lavin et al. | 260—29.1 |
| 3,423,366 | 1/1969 | De Brunner et al. | 260—65 |
| 3,435,004 | 3/1969 | Hathaway et al. | 260—65 |

WILLIAM H. SHORT, Primary Examiner

L. L. LEE, Assistant Examiner

U.S. Cl. X.R.

117—123, 124, 132, 161; 156—331; 161—190, 227; 260—33.2, 33.4, 37, 47, 78, 78.4